(12) United States Patent
Li et al.

(10) Patent No.: US 10,319,327 B2
(45) Date of Patent: Jun. 11, 2019

(54) TIME-SHARING DRIVING METHOD OF TOUCH DISPLAY PANEL

(71) Applicant: Wuhan China Star Optoelectronics Technology Co., Ltd., Wuhan, Hubei (CN)

(72) Inventors: Man Li, Guangdong (CN); Wei Chen, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 217 days.

(21) Appl. No.: 15/303,477

(22) PCT Filed: Aug. 17, 2016

(86) PCT No.: PCT/CN2016/095772
§ 371 (c)(1),
(2) Date: Oct. 11, 2016

(87) PCT Pub. No.: WO2018/006473
PCT Pub. Date: Jan. 11, 2018

(65) Prior Publication Data
US 2018/0182342 A1      Jun. 28, 2018

(30) Foreign Application Priority Data

Jul. 8, 2016   (CN) .......................... 2016 1 0537058

(51) Int. Cl.
*G09G 3/36*       (2006.01)
*G06F 3/041*      (2006.01)
*G06F 3/044*      (2006.01)

(52) U.S. Cl.
CPC ......... *G09G 3/3685* (2013.01); *G06F 3/0412* (2013.01); *G06F 3/0416* (2013.01); *G09G 3/3648* (2013.01); *G06F 3/044* (2013.01); *G09G 2310/08* (2013.01); *G09G 2320/0233* (2013.01); *G09G 2330/12* (2013.01)

(58) Field of Classification Search
CPC ............... G09G 3/3685; G09G 3/0412; G09G 2330/12; G09G 2320/0233
See application file for complete search history.

(56) References Cited

U.S. PATENT DOCUMENTS

| | | | |
|---|---|---|---|
| 9,058,072 B2 | 6/2015 | Bae | |
| 2010/0164922 A1* | 7/2010 | Nose | ................... G09G 3/3406 345/207 |
| 2012/0293452 A1 | 11/2012 | Tun et al. | |
| 2015/0084920 A1 | 3/2015 | Abe et al. | |
| 2015/0332638 A1* | 11/2015 | Li | ........................ G09G 3/3648 345/214 |

(Continued)

*Primary Examiner* — Ryan A Lubit
(74) *Attorney, Agent, or Firm* — Andrew C. Cheng

(57) ABSTRACT

The present disclosure discloses a driving method and a driving device of a display panel. The driving method comprises: to detect the operating state of said display panel; to switch the bias current which is in said data line driving circuit according to said operating state of said display panel in order to make display brightness of said display panel be uniform. Through the above way, the present disclosure can improve the signal distortion caused by the leakage current of the gate signal on the data line, making the brightness of the display panel be uniform, improving the user's experience.

2 Claims, 4 Drawing Sheets

(56) References Cited

U.S. PATENT DOCUMENTS

| | | | |
|---|---|---|---|
| 2016/0179256 A1* | 6/2016 | Yang | G06F 3/0412 |
| | | | 345/173 |
| 2016/0246429 A1 | 8/2016 | Ma et al. | |
| 2016/0259455 A1 | 9/2016 | Li et al. | |
| 2016/0291714 A1 | 10/2016 | Wu | |
| 2017/0205932 A1* | 7/2017 | Yang | G06F 3/0412 |
| 2017/0300165 A1* | 10/2017 | Shin | G06F 3/0416 |
| 2018/0004329 A1* | 1/2018 | So | G02F 1/13338 |
| 2018/0004345 A1* | 1/2018 | Shin | G02F 1/13338 |

* cited by examiner

TIME-SHARING DRIVING METHOD OF TOUCH DISPLAY PANEL

BACKGROUND OF THE DISCLOSURE

1. Field of the Disclosure

The present disclosure relates to a liquid crystal display field, and in particular to a driving method and a driving device of a display panel.

2. The Related Arts

Along with the advancement of technology, the demand of consumer electronic products and in particular to the performance and appearance of smart phones and tablets becomes higher and higher. The feature of light, thin, short, small has become the common pursuit of every electronic product vendors in order to cater to the market. In order to achieve the lighter and thinner electronic products, the screens of phone, tablet and so on are mostly capacitive touch screen which is integrated the display and touch function, which specifically comprises On-Cell, Hybrid In-Cell and Full In-Cell, the latter has lighter and thinner display panel than the previous two technologies.

The LCD of the small and medium size LTPS of the full in-cell architecture mostly adopts the driving method (as shown in FIG. 1) of time-sharing driving in display state and touch scan state: every time the gate driving signal scans the partial display units in the display panel such as Nth row of row pixel which is in display state, the gate driving signal stops and scans the partial touch units in order to be in TP stage, and then the gate driving signal scans the partial display units sequentially arranged in order to be in display state, and then the gate driving signal stops and scans the partial touch units sequentially arranged in order to be in TP stage, and so forth, until one frame image completes the display on the display panel, so that the interference between the display and the touch scan is less.

However, during the partial display unit such as Nth row of row pixel completed scan and scanning the partial touch unit, the source signal of the data line of the driving display panel will keep low voltage such as ground, GND, it will cause leakage current. Meanwhile, after the partial touch unit scan completed, when scanning the next row pixel sequentially arranged such as (N+1)th row of row pixel, the source signal of (N+1)th row of row pixel will cause signal distortion (as shown in FIG. 2) because of the leakage current, namely, the rising edge and the falling edge of the source signal will seriously delay, eventually leading to (N+1)th row of row pixel be not fully charged, therefore, the brightness of (N+1)th row of row pixel is dim, forming a dark line (as shown in FIG. 3), thereby greatly reducing the user's experience.

Therefore, how to eliminate the dark line of In Cell LCD caused by the time-sharing scan of display state and TP stage is serious problem.

SUMMARY OF THE DISCLOSURE

The present disclosure is mainly to provide a driving method of a display panel, which can eliminate the dark line caused by the time-sharing scan of display state and TP stage.

In order to solve the above technical issue, a technical solution adopted by the present disclosure is: to provide a driving method of a display panel, wherein said display panel comprises a plurality of display units and a plurality of touch units, said display unit and said touch unit being time-sharing driven in a display period of a frame image in order to make operating state of said display panel be time-sharing in display state and touch scan state, said method comprising: to provide a bias current which is in a data line driving circuit as a first current; to acquire current data frame, and said first current driving a data line of said display panel to display said corresponded part of current data frame in the first display unit; to detect the operating state of said display panel; to switch the bias current which is in said data line driving circuit according to said operating state of said display panel in order to make display brightness of said display panel be uniform; wherein said operating state comprises said display state and said touch scan state, said bias current comprises said first current and a second current; wherein said first current is less than said second current, the driving ability of said data line driving circuit with said second current is larger than said first current.

Wherein said method further comprises: to determine whether said display unit which is to be displayed is the last display unit of said display panel; if said display unit which is to be displayed is the last display unit of said display panel, to proceed with the operation of detecting the operating state of said display panel.

In order to solve the above technical issue, another technical solution adopted by the present disclosure is: to provide a driving method of a display panel, wherein said method comprises: to detect the operating state of said display panel; to switch the bias current which is in said data line driving circuit according to said operating state of said display panel in order to make display brightness of said display panel be uniform; wherein said operating state comprises said display state and said touch scan state, said bias current comprises said first current and a second current.

Wherein said display panel comprises a plurality of display units and a plurality of touch units, said display unit and said touch unit being time-sharing driven in a display period of a frame image in order to make operating state of said display panel be time-sharing in display state and touch scan state, said method comprising: to provide a bias current which is in a data line driving circuit as a first current; to acquire current data frame, and said first current driving a data line of said display panel to display said corresponded part of current data frame in the first display unit.

Wherein the steps of switching the bias current which is in said data line driving circuit according to said operating state of said display panel comprises: to determine whether said operating state of said display panel is converted from said touch scan state to said display state; if said operating state of said display panel is converted from said touch scan state to said display state, to provide said bias current in said data line driving circuit as said second current; said second current driving a data line of said display panel to display first row of a row pixel in said display panel which is to be displayed; to determine whether the display of first row of said row pixel has completed; if the display of first row of said row pixel having been completed, to switch said bias current in said data line driving circuit from said second current to said first current, and said first current driving a data line of said display panel to display said corresponded part of current data frame in said display panel which is to be displayed.

Wherein said method further comprises: to determine whether said display unit which is to be displayed is the last display unit of said display panel; if said display unit which is to be displayed is not the last display unit of said display panel, to proceed with the operation of detecting the operating state of said display panel.

Wherein said first current is less than said second current, the driving ability of said data line driving circuit with said second current is larger than said first current.

In order to solve the above issue, the other technical solution adopted by the present disclosure is: to provide a driving device of a display panel, wherein said driving device comprises: a detection module, which is used to detect the operating state of said display panel; a switching module, which is connected with said detection module, which is used to switch the bias current of the data line driving circuit according to said operating state of said display panel detected by said detection module in order to make display brightness of said display panel be uniform; wherein said operating state comprises said display state and said touch scan state, said bias current comprises said first current and a second current.

Wherein said display panel comprises a plurality of display units and a plurality of touch units, said display unit and said touch unit being time-sharing driven in a display period of a frame image in order to make operating state of said display panel be time-sharing in display state and touch scan state; said driving device further comprising an initial module, wherein said initial module is used to provide said bias current of said data line driving circuit as a first current; moreover, to acquire current data frame, and said first current driving a data line of said display panel to display said corresponded part of current data frame in the first display unit.

Wherein said switching module comprises: a first judgment unit, which is used to determine whether said operating state of said display panel is converted from said touch scan state to said display state; a processing unit, which is connected with said first judgment unit, which is used to provide said bias current of said data line driving circuit as said second current and said second current driving a data line of said display panel to display first row of a row pixel in said display panel which is to be displayed when said first judgment unit determines that said operating state of said display panel is converted from said touch scan state to said display state; a second judgment unit, which is connected with said processing unit, which is used to determine whether said processing unit has completed the display of first row of said row pixel; wherein when said second judgment unit determines that said processing unit has completed the display of first row of said row pixel, said processing unit being also used to switch said bias current of said data line driving circuit from said second current to said first current, and said first current driving a data line of said display panel to display said corresponded part of current data frame in said display panel which is to be displayed.

Wherein said switching module further comprises: a third judgment unit, which is used to determine whether said display unit which is to be displayed is the last display unit of said display panel; wherein if said third judgment unit determines that said display unit which is to be displayed is not the last display unit of said display panel, said detection unit proceeds with the operation of detecting the operating state of said display panel.

Wherein said first current is less than said second current, the driving ability of said data line driving circuit with said second current is larger than said first current.

The benefit effect of the present disclosure is: the driving method and the driving device of the display panel detect the operating state of the display panel, switching the bias current of the data line driving circuit according to the operating state of the display panel, thus improving the signal distortion caused by the leakage current of the gate signal on the data line, thereby eliminating the dark line of the prior art, making the brightness of the display panel be uniform, improving the user's experience.

DETAILED DESCRIPTION OF THE PREFERRED EMBODIMENTS

The following will describe the present disclosure in detail through combining the drawings and the embodiments.

Figure 1:
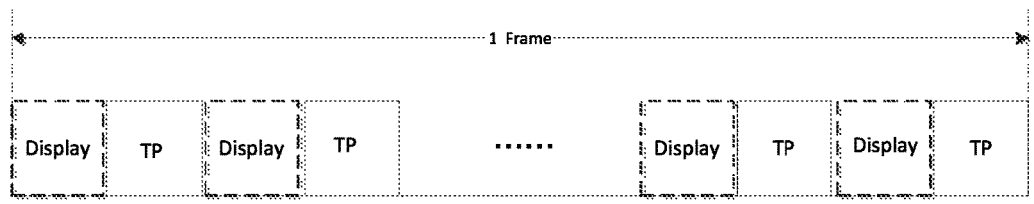
FIG. 1 is a schematic diagram of the display state and touch scan state time-sharing driven in the display panel of the prior art.
Figure 2:
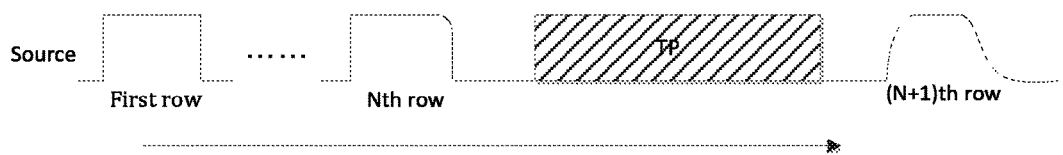
FIG. 2 is a schematic diagram of the source signal in the display panel of the prior art.
Figure 3:
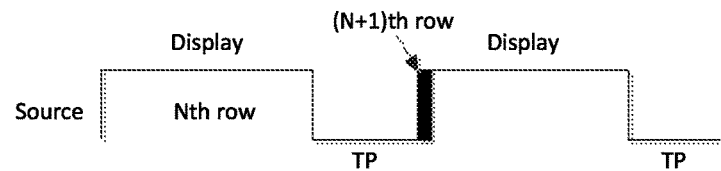
FIG. 3 is a schematic diagram of the dark line in the display panel of the prior art.
Figure 4:
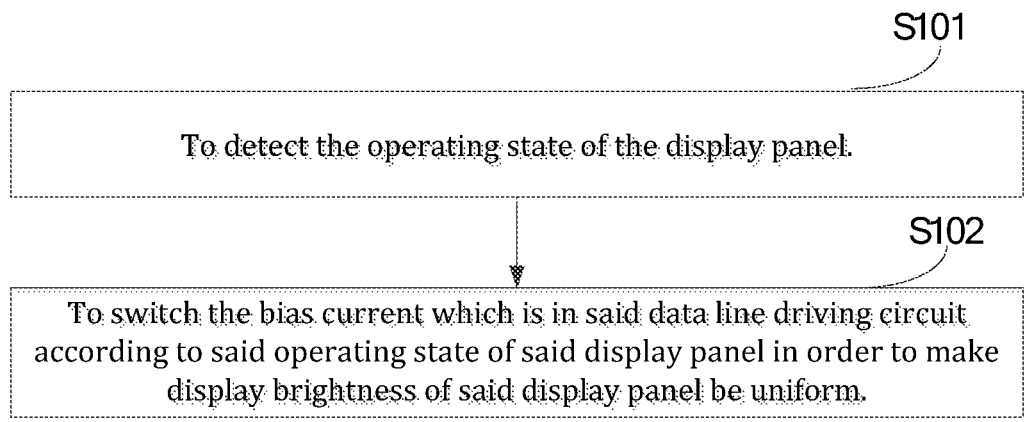
FIG. 4 is a flow chart of the driving method of the display panel of the first embodiment of the present disclosure.

FIG. 4 is a flow chart of the driving method of the display panel of the first embodiment of the present disclosure. As shown in FIG. 4, the method comprises the following steps:

Step S101: to detect the operating state of the display panel.

In the step S101, the operating state of the display panel comprises a display state and a touch scan state. Wherein during a frame image displaying, the operating state of the display panel is switched between the display state and the touch scan state.

Step S102: to switch the bias current which is in said data line driving circuit according to said operating state of said display panel in order to make display brightness of said display panel be uniform.

In the step S102, in the driving architecture of the display panel of small and medium size, the final stage of the source driving circuit is connected with an operation amplifier, OP, namely the data line driving circuit, which is used to improve the driving ability of the source signal in order to drive the large number of data lines in the display panel. Wherein the driving ability of the data line driving circuit is proportional to the corresponded bias current, the larger the bias current is, the stronger the driving ability is.

In the present embodiment, the bias current of the data line driving circuit comprises a first current and a second current, wherein the first current is less than the second current, the driving ability of said data line driving circuit with said second current is larger than said first current.

In the present embodiment, the bias current of the data line driving circuit is changed according to the operating state of the display panel, thereby improving the signal distortion caused by the leakage current of the gate signal on the gate line, further eliminating the dark line occurred in the prior art, making the display brightness of the display panel be uniform.

Figure 5:
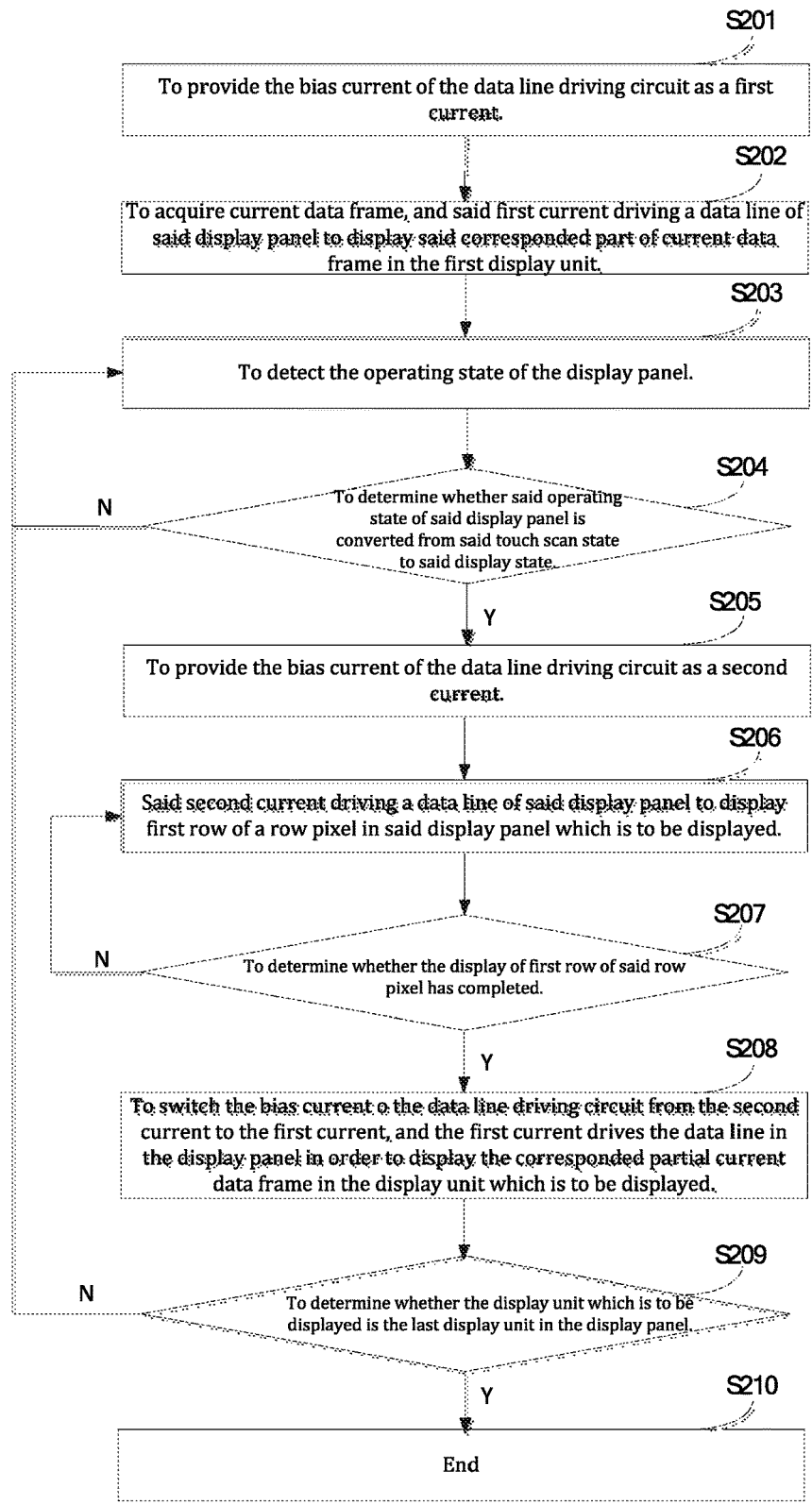
FIG. 5 is a flow chart of the driving method of the display panel of the second embodiment of the present disclosure.

FIG. 5 is a flow chart of the driving method of the display panel of the second embodiment of the present disclosure, the present flow chart takes a frame image for example to describe, wherein the display panel comprises a plurality of display units and a plurality of touch units, said display unit and said touch unit are time-sharing driven in a display period of a frame image in order to make operating state of said display panel be time-sharing in display state and touch scan state. To be noted is, if there is substantially the same result, the method of present disclosure is not limited by the flow sequence as shown in FIG. 5. As shown in FIG. 5, the method comprises the following steps:

Step S201: to provide the bias current of the data line driving circuit as a first current.

In the step S201, the data line driving circuit is use to improve the driving ability of the source signal in order to drive the large number of data lines in the display panel. Wherein the driving ability of the data line driving circuit is proportional to the corresponded bias current, the larger the bias current is, the stronger the driving ability is.

In the present embodiment, the bias current can be provided as a first current and a second current, wherein the first current is preferably 20 mA, the second current is preferably 30 mA. Namely, in the present embodiment, the second current is larger than the first current, thus making the driving ability of the source signal with the second current is larger than the first current, further making the row pixel easier to charge full with the second current than the first current.

In the present embodiment, before a frame image displaying, the bias current of the data line driving circuit is provided as the first current.

Step S202: to acquire current data frame, and said first current driving a data line of said display panel to display said corresponded part of current data frame in the first display unit.

In the step S202, the display panel comprises a plurality of display units and a plurality of touch units, each display unit and each touch unit are sequentially arranged and are corresponded with each other, each display unit sequentially display, thereby completing the display of the current frame image, each touch unit sequentially drives, thereby achieving the touch function. Wherein the display unit and the touch unit are time-sharing driven in the display period of one frame image, thereby making the operating state of the display panel is time-sharing in display state and touch scan state.

Namely, after the display panel receiving the current data frame, at the first, driving the first display unit in order to display the current data frame corresponded to the first display unit to the first display unit, and then driving the first touch unit, and then driving the second display unit in order to display the current data frame corresponded to the second display unit to the second display unit, and then driving the second touch unit, and so forth, until the display of the current data frame on the display panel is completed.

In the present embodiment, after the current display panel acquiring the current data frame, the first current drives the data line in the display panel in order to apply for the current data frame of the first display unit displaying in the first display unit in order to start the display of the current data frame, and then driving the first touch unit.

Step S203: to detect the operating state of the display panel.

In the step S203, the operating state of the display panel comprises a display state and a touch scan state, the operating state of the display panel is switched between the display state and the touch scan state.

Those skilled in the art will realize that the display state is namely the state of the display panel during driving the display unit, the touch scan state is namely the state of the display panel during driving the touch unit.

Step S204: to determine whether said operating state of said display panel is converted from said touch scan state to said display state, if yes, executing the step S205, otherwise executing the step S203.

In the step S204, the operating state of the display panel is switched between the touch scan state and the display state, wherein when the operating state of the display panel is switched from the touch scan state to the display state, executing the step S205, otherwise executing the step S203.

Step S205: to provide the bias current of the data line driving circuit as a second current.

In the step S205, when the step S024 determines the operating state of the display panel is switched from the touch scan state to the display state, if the first current drives the data line of the display panel in order to display the partial current data frame, the first row of row pixel in the display unit which is to be displayed will occur the dark line. Therefore, in the present embodiment, when the operating state of the display panel is switched from the touch scan state to the display state, to provide the bias current of the data line driving circuit as the second current in order to improve the driving ability of the source signal, further eliminating the dark line.

Step S206: said second current driving a data line of said display panel to display first row of a row pixel in said display panel which is to be displayed.

In the step S206, using the second current to drive the data line of the display panel can make up for leakage problem occurred in the prior art, making the first row of row pixel in the display unit which is to be displayed more easily charged to full, thereby eliminating the dark line of the prior art. From the other perspective, after the touch scan state completed, the second current such as 30 mA drives the data line of the display panel in order to display the first row of row pixel of the display unit which is to be displayed, comparing with the first current such as 20 mA, the driving ability of the first row of row pixel is improved 1.5 times as large as the original, thereby compensating the dark line caused by the leakage current of the touch scan, improving the display quality.

Step S207: to determine whether the display of first row of said row pixel has completed, if yes, executing the step S208, otherwise executing the step S206.

Step S208: to switch the bias current o the data line driving circuit from the second current to the first current, and the first current drives the data line in the display panel in order to display the corresponded partial current data frame in the display unit which is to be displayed.

In the step S208, when the step S207 determines the first row of row pixel in the display unit which is to be displayed has completed the display, switching the bias current of the data line driving circuit from the second current to the first current, and the first current drives the data line of the display panel in order to complete the display of the other row of row pixel in the display unit which is to be displayed, and then driving the corresponded touch unit.

Step S209: to determine whether the display unit which is to be displayed is the last display unit in the display panel, if yes, executing the step S210, otherwise executing the step S203.

In the step S209, if the display unit which is to be displayed is determined that the display unit is not the last one in the display panel. In the present embodiment, keep detecting the operating state of the display panel, when the operating state of the display panel is detected to be switched from the touch scan state to the display state, providing the bias current of the data line driving circuit as the second current.

Otherwise, if the display unit which is to be displayed is determined to be the last display unit of the display panel, then the display of the current data frame has completed, there will be no more operation.

Those skilled in the art will realize that the dark line on the display panel is not only one, the number of the dark lines is related to the number of the display units. Wherein except the first display unit, the first row of row pixel of the other displays will occur dark lines, therefore, the operation of detecting the operating state of the panel requires more time to carry out, thereby adopting the second current to drive the data line of the display panel during displaying the first row of row pixel of each display unit, further eliminating the plurality of dark lines occurred on the display panel, improving the display quality.

Step S210: end.

Those skilled in the art will realize that, in the other embodiments, after executing the step S203 that detecting the operating state of the display panel, also able to determine whether the operating state of the display panel is in display state. If the operating state of the display panel is in display state, and then determining whether the row pixel which is to be displayed is the first row of row pixel in the display unit which is to be displayed; if the operating state of the display panel is not in the display state, keep on executing the operation of detecting the operating state of the display panel. If the row pixel which is to be displayed is the first row of row pixel in the display unit which is to be displayed, and then providing the bias current of the data line driving circuit as the second current, and the second current drives the data line of the display panel in order to display the first row of row pixel, and keep on determining whether the row pixel which is to be displayed is the first row of row pixel in the display unit which is to be displayed; if the row pixel which is to be displayed is not the first row of row pixel in the display unit which is to be displayed, and then providing the bias current of the data line driving circuit as the first current, and the first current drives the data line of the display panel in order to complete the display of the other row pixels in the display unit which is to be displayed that is differed from the first row of row pixel, and keep on executing the step S209.

Figure 6:
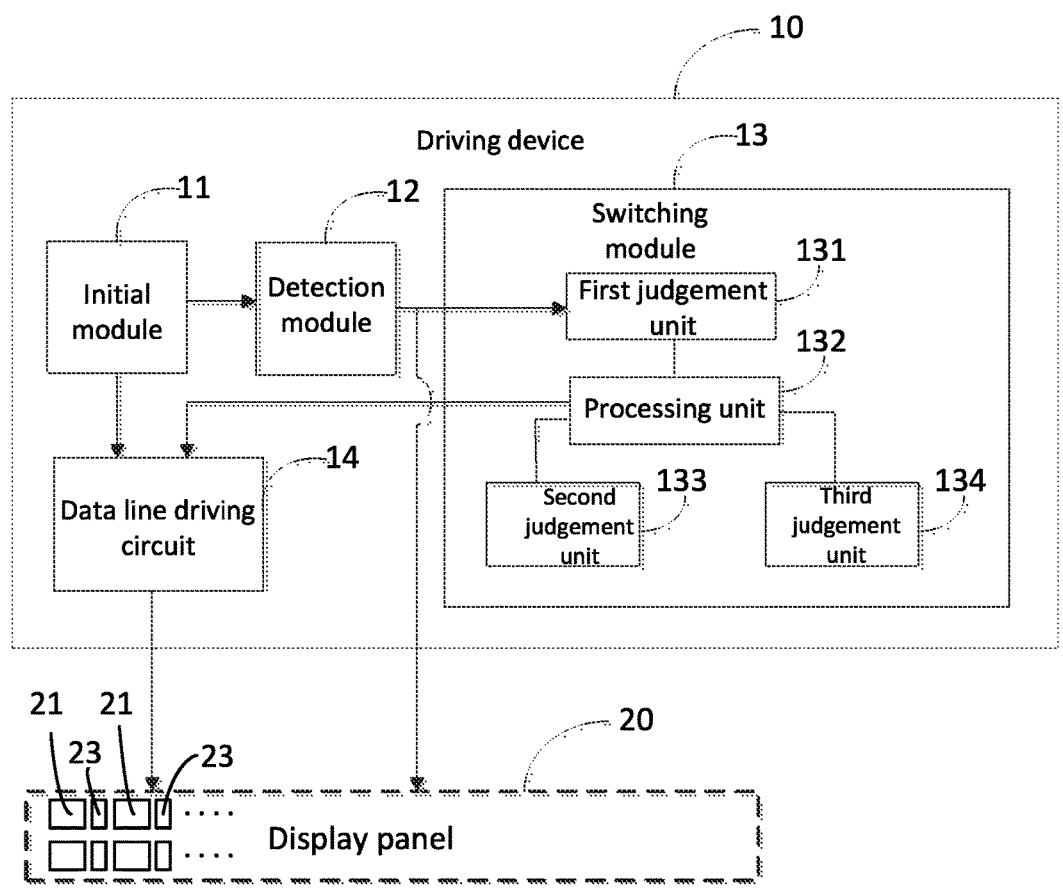
FIG. 6 is a structure diagram of the driving device of the display panel of the embodiment of the present disclosure.

FIG. 6 is a structure diagram of the driving device of the display panel of the embodiment of the present disclosure. As shown in FIG. 6, the driving device 10 is used to drive the display panel 20. Wherein the driving device 10 comprises: an initial module 11, a detection module 12, a switching module 13 and a data line driving circuit 14. Wherein the display panel 20 comprises a plurality of display units 21 and a plurality of touch units 23, said display unit 21 and said touch unit 23 are time-sharing driven in a display period of a frame image in order to make operating state of said display panel 20 be time-sharing in display state and touch scan state. Wherein the data line driving circuit 14 directly drives the data line of the display panel 20 in order to display images in the display unit 21.

The initial module is used to provide the bias current of the data line driving circuit 14 as the first current; moreover, acquiring the current data frame, and the first current drives the data line of the display panel 20 in order to display the corresponded partial current data frame in the first display unit 21.

The detection module 12 is connected with the initial module 11, after the first current of the initial module 11 driving the data line of the display panel in order to display the corresponded partial current data frame, to determine the operating state of the display panel 20. Wherein the operating state of the display panel 20 comprises a display state and a touch scan state.

The switching module 13 is connected with the detection module 12, which is used to switch the bias current of the data line driving circuit 14 according to the operating state of the display panel detected by the detection module 12 in order to make the brightness of the display panel 20 be uniform. Wherein the bias current comprises a first current and a second current. Preferably, the first current is less than the second current, the driving ability of the data line driving circuit with the second current is greater than the first current.

Specifically, the switching module 13 comprises a first judgment unit 131, a processing unit 132, a second judgment unit 133 and a third judgment unit 134. The first judgment unit 131 is connected with the detection module 12, which is used to determine whether the operating state of the display panel is switched from the touch scan state to the display state. The processing unit 132 us connected with the first judgment unit 131, which is used to provide the bias current of the data line driving circuit 14 as the second current and to use the second current to drive the data line of the display panel in order to display the first row of row pixel in the display panel which is to be displayed when the first judgment unit 131 determines that the operating state is switched form the touch scan state to the display state. The second judgment unit 133 is connected with the processing unit 132, which is used to determine whether the processing unit 132 has completed the display of the first row of row pixel. Wherein when the second judgment unit 133 determines that the processing unit 132 has completed the display of the first row of row pixel, the processing unit 132 is also used to switch the bias current of the data line driving circuit 14 from the second current to the first current, and the first current drives the data line in the display panel 20 in order to display the corresponded partial current data frame in the display unit which is to be displayed. The third judgment unit 134 is connected with the processing unit 132, after the processing unit 132 completing that the first current drives the data line of the display panel 20 in order to display the corresponded partial current data frame in the display unit which is to be displayed, to determine whether the display unit which is to be displayed is the last display unit in the display panel 20. Wherein if the third judgment 134 determines the display unit which is to be displayed is not the last display unit in the display panel, the detection module 12 keeps on executing the operation of detecting the operating state of the display panel; if third judgment 134 determines the display unit which is to be displayed is the last display unit in the display panel, the initial module 11 is restarted in order to receive the next data frame to achieve the display of the next data frame.

The benefit effect of the present disclosure is: the driving method and the driving device of the display panel detect the operating state of the display panel, switching the bias current of the data line driving circuit according to the operating state of the display panel, thus improving the signal distortion caused by the leakage current of the gate signal on the data line, thereby eliminating the dark line of the prior art, making the brightness of the display panel be uniform, improving the user's experience.

The preferred embodiments according to the present invention are mentioned above, which cannot be used to define the scope of the right of the present invention. Those variations of equivalent structure or equivalent process according to the present specification and the drawings or directly or indirectly applied in other areas of technology are considered encompassed in the scope of protection defined by the claims of the present invention.

What is claimed is:

1. A driving method of a display panel, wherein said display panel comprises a plurality of display units and a plurality of touch units, said display unit and said touch unit being time-sharing driven in a display period of a frame image in order to make operating state of said display panel be time-sharing in display state and touch scan state, the display state corresponding to a plurality of display stages, the touch scan state corresponding to a plurality of touch scan stages, wherein the display period of a frame image includes the plurality of display stages and the plurality of touch stages, said method comprising:

providing a bias current which is in a data line driving circuit as a first current;

acquiring current data frame, and said first current driving a data line of said display panel during one display stage of the plurality of display stages to display a corresponded part of said current data frame in a first display unit;

determining the operating state of said display panel;

switching the bias current which is in said data line driving circuit according to said operating state of said display panel in order to make display brightness of said display panel be uniform;

wherein said operating state comprises said display state and said touch scan state, said bias current comprises said first current and a second current;

wherein said first current is less than said second current, the driving ability of said data line driving circuit with said second current is larger than that of said data line driving circuit with said first current;

wherein the step of switching the bias current which is in said data line driving circuit according to said operating state of said display panel comprises:

determining whether said operating state of said display panel is converted from said touch scan state to said display state;

when said operating state of said display panel is converted from said touch scan state to said display state, providing said bias current in said data line driving circuit as said second current;

said second current driving a data line of said display panel during another display stage of the plurality of display stages to display a first row of a second corresponded part of the current data frame row pixel in said display panel;

determining whether the display of first row of said row pixel has completed;

when the display of first row of said row pixel having been completed, switching said bias current in said data line driving circuit from said second current to said first current, and said first current driving a data line of said display panel to display said corresponded part of current data frame in said display panel which is to be displayed.

2. The driving method as claimed in claim 1, wherein said method further comprises:

determining whether said display unit which is to be displayed is the last display unit of said display panel;

when said display unit which is to be displayed is the last display unit of said display panel, proceeding with the operation of determining the operating state of said display panel.

* * * * *